(12) United States Patent
Moller

(10) Patent No.: US 6,401,755 B2
(45) Date of Patent: Jun. 11, 2002

(54) DAMPING VALVE

(75) Inventor: Robert Moller, Aidhausen (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/800,686

(22) Filed: Mar. 7, 2001

(30) Foreign Application Priority Data

Mar. 8, 2000 (DE) .......................................... 100 11 168

(51) Int. Cl.⁷ .............................................. F16K 15/16
(52) U.S. Cl. .................................... 137/854; 137/493.8
(58) Field of Search ........................... 137/493.8, 493.9, 137/854

(56) References Cited

U.S. PATENT DOCUMENTS

| | | | |
|---|---|---|---|
| 2,316,924 A | * 4/1943 | Whisler | 137/493.8 |
| 4,624,347 A | * 11/1986 | Mourray | 137/493.9 |
| 4,815,576 A | * 3/1989 | Tanaka | 137/854 |
| 5,259,294 A | 11/1993 | May | 92/181 P |
| 5,425,398 A | * 6/1995 | Moradmand et al. | 137/854 |

FOREIGN PATENT DOCUMENTS

| | | |
|---|---|---|
| DE | 1 875 383 | 7/1963 |
| DE | 27 11 161 | 10/1977 |
| DE | 27 51 046 | 11/1977 |
| DE | 89 08 341 | 10/1989 |
| DE | 40 33 186 | 4/1992 |
| DE | 43 43 614 | 1/1995 |
| DE | 44 04 835 | 8/1995 |
| DE | 196 21 639 | 7/1997 |
| DE | 198 19 754 | 9/1999 |
| EP | 0 671 572 | 9/1995 |

\* cited by examiner

Primary Examiner—Stephen M. Hepperle
(74) Attorney, Agent, or Firm—Cohen, Pontani, Lieberman & Pavane

(57) ABSTRACT

A damping valve comprising a one-piece damping-valve body with axial through-passages for each direction of flow, at least one side of the damping-valve body having arranged on it at least one valve disk that at least partially covers an outlet opening of a through-passage, the damping-valve body having a radial inflow opening to the through-passages. The outlet openings of the through-passages for a first direction of flow on one side of the damping-valve body have a trapezoidal cross section, and the outlet openings of the through-passages for a second direction of flow on the other side of the damping-valve body open into a common encircling annular channel. The through-passages with outlet openings with the trapezoidal cross section are arranged on a larger pitch circle than the through-passages that open into the annular channel.

5 Claims, 3 Drawing Sheets

DAMPING VALVE

BACKGROUND OF THE INVENTION

1. Field of the Invention

The invention relates to a damping valve of the type having a one piece damping valve body with axial through passages for each direction of flow, a valve disk which at least partially covers outlet openings of through passages on at least one of said sides, and radial inflow openings for through passages.

2. Description of the Related Art

In the case of a damping valve in a piston-cylinder unit, especially a vibration damper, the aim is to make the through-passages or at least the cross sections at the outlet openings as large as possible. The installation space available for the through-passages in the damping-valve body of the damping valve is very limited. This has led to complex solutions that can often only be implemented by sintering if multi-component damping-valve bodies are used.

U.S. Pat. No. 5,259,294 discloses a sintered piston having two interengaging halves that together define the through-passages. With damping-valve bodies of this kind, there is, on the one hand, a need for complex sintering dies and, on the other hand, there is always the possibility that the damping-valve body will leak between the contact faces of the two halves of the piston. The complex form of the sintering dies is due to the fact that the through-passages have oblique sections.

An alternative to the oblique through-passages is known from DE 43 43 614 A1. The axially extending through-passages have a radial inflow opening. A significant disadvantage of this damping valve is that the inflow openings have to be machined into the damping-valve body. In this context, attention is also drawn to DE 196 21 639 A1.

Another possibility for creating large through-passages in a damping valve is known from DE 27 51 046 A1. The damping valve comprises two piston halves with through-passages for two directions of flow. Arranged on a radially outer pitch circle are axially extending inflow passages, the ends of which are connected to a common nonreturn valve. The nonreturn valve opens a transverse passage that leads to the through-passages with the outlet openings.

DE 40 33 186 A1 describes a restriction device with a bypass circuit dependent on the direction of motion that has axially extending through-passages in conjunction with radial inflow openings. Among the disadvantages of this restriction device is that measures have to be provided to prevent the valve disks sticking on the piston surface, e.g. by roughening the piston surface in the region of the valve disks. The through-passages or at least the outlet openings are furthermore kept relatively small, as a result of which the damping forces of the restriction device are relatively large.

SUMMARY OF THE INVENTION

It is the object of the present invention to obtain a damping valve that has a one-piece damping-valve body that requires little mechanical finish machining, if any, and has all possible fittings as regards its valve disks.

According to the invention, the outlet openings of the through-passages for a first direction of flow on one side of the damping-valve body have a trapezoidal cross section, and the outlet openings of the through-passages for a second direction of flow on the other side of the damping-valve body open into a common encircling annular channel. The through-passages with outlet openings with the trapezoidal cross section are arranged on a larger pitch circle than the through-passages that open into the annular passage.

The advantage of the new damping valve lies, on the one hand, in its simple damping-valve body and, on the other hand, in the large areas subjected to pressure on the valve disks. On the one hand, the sum of the trapezoidal cross sections should be regarded as one area subjected to pressure. The annular channel forms the area subjected to pressure for the valve disk for the other direction of flow. The larger pitch circle for the outlet openings of trapezoidal cross section represents a larger lever arm for the pressure acting on the valve disk. The annular passage acting in its entirety as an area subjected to pressure can therefore be made radially further inward and nevertheless produce the desired low damping force.

In order to minimize the area of contact for the valve disk for the first direction of flow and hence prevent sticking of the valve disk, the radial inflow openings are connected by an encircling channel at their radially inner ends.

In a further advantageous refinement, the outlet openings of trapezoidal cross section are framed by an encircling ridge, one portion of the encircling ridge bounding the encircling channel. The ridge forms support surfaces for the valve disk for the first direction of flow.

To achieve as large as possible a cross section for the damping medium flowing into the damping valve, the radial inflow openings are arranged between the outlet openings of trapezoidal cross section, an adjoining portion of the through-passage being embodied as a funnel. The funnel is a shape that is easy to form and allows advantageous deflection of the damping medium from the radial inflow opening into the axial through-passage.

According to another advantageous embodiment, the funnel of the through-passage is framed over an arc segment by the encircling ridge of the outlet opening of trapezoidal cross section. The aim of this measure is to achieve as large as possible a funnel opening. For this purpose, it is advisable for the funnel to extend right up to the trapezoidal outlet openings arranged in the circumferential direction and to cancel out the pure trapezoidal shape at said arc segment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
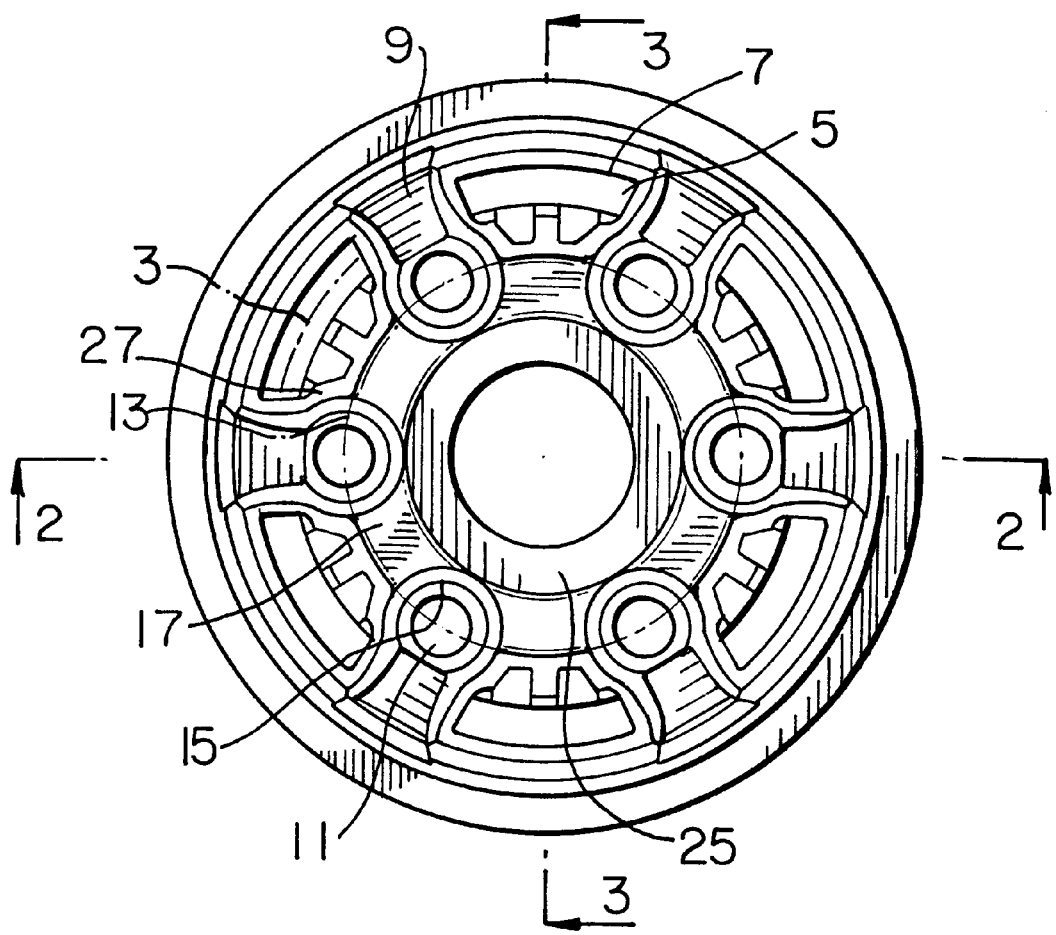
FIG. 1 shows a damping-valve body of the damping valve in plan view.

FIG. 1 shows a damping-valve body 1, which is produced by a sintering technique and is in one piece. Transverse through-passages 5 for a first direction of flow are formed on a first pitch circle 3. The transverse through-passages 5 have a trapezoidal outlet opening. Each outlet opening is framed by an encircling ridge 7. Radially extending inflow openings 9 for through-passages 11 are formed on a smaller pitch circle 13 between the circumferentially arranged transverse through-passages 5 with the trapezoidal outlet openings. Toward the inflow openings 9, the through-passages 11 have funnels 15 (see FIG. 2), contour lines being provided to make this clear. The inflow openings 9 and hence also the through-passages 11 are connected on one side 19 of the damping valve by an encircling channel 17. On the opposite side 21 of the damping-valve body, the same through-passages 11 have an encircling annular passage 23 (see FIGS. 2 and 3). The encircling passage 17 is separated from the through-passages 5 by the ridge 7 and is filled with a damping medium. Consequently, only the sum of the end faces of the ridge 7 plus an annular clamping surface 25 remain as valve support surfaces. Sticking of a valve disk on the damping-valve body is therefore to be considered to be unlikely.

The funnels 15 of the through-passages 11 are dimensioned in such a way that they are framed by an arc segment 27 of the ridges 7, the trapezoidal outlet openings of the through-passages 5 having an arc corresponding to the funnel shape.

Figure 2:
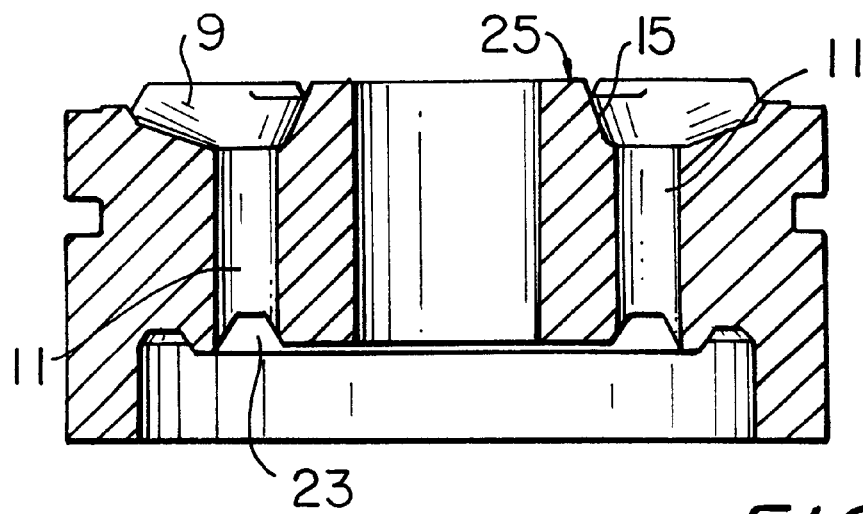
FIG. 2 shows a damping-valve body in accordance with section A—A.
Figure 3:
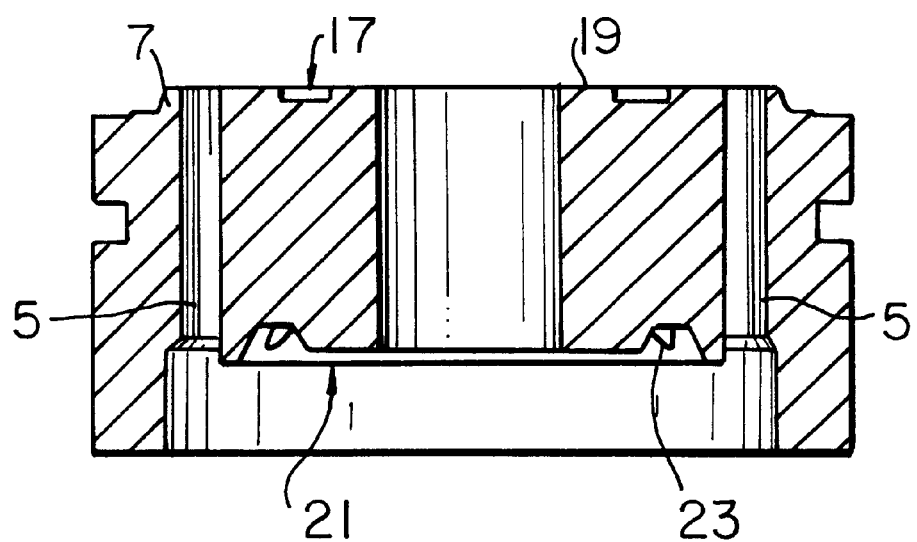
FIG. 3 shows a damping-valve body in accordance with section B—B.
Figure 4A:
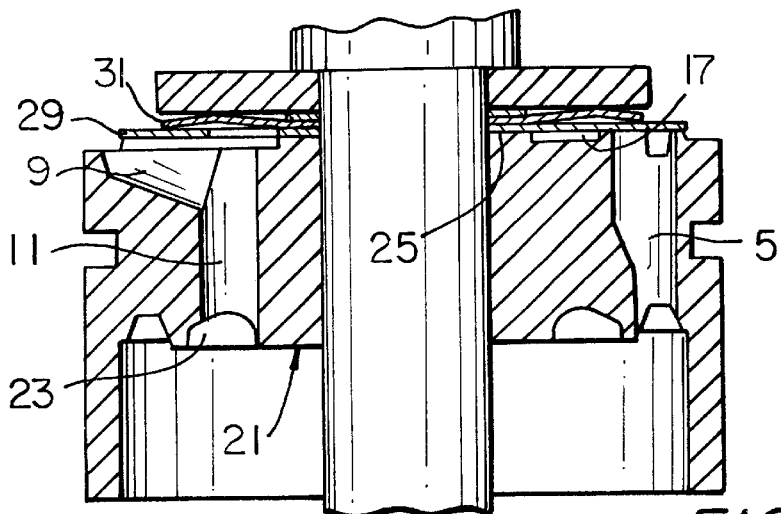
FIGS. 4a–4c show a damping valve with various fittings.
Figure 4B:
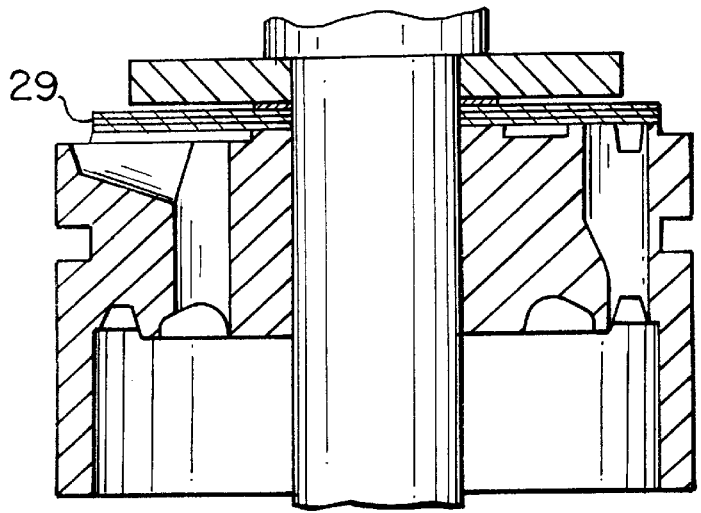
Figure 4C:
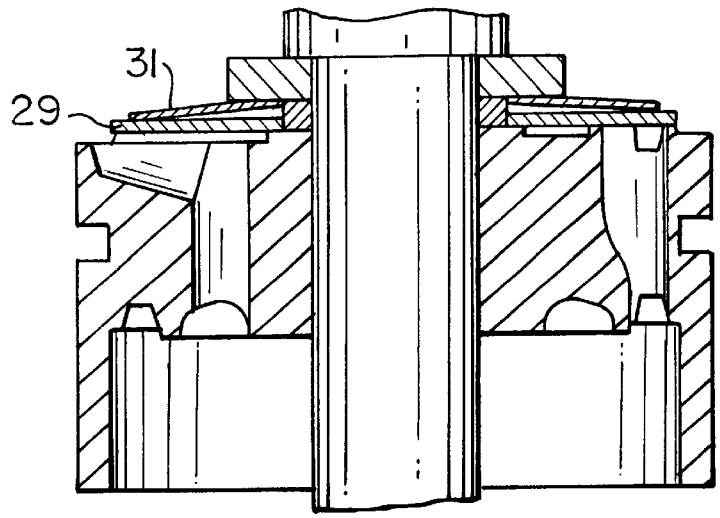

In FIGS. 4a to 4c, the damping-valve body as depicted in FIG. 2 is fitted with various valve disks 29 and valve springs 31. Common to all the valve disks 29 is that they can be fitted without alignment in the circumferential direction since the through-passages 5; 11 are separated by the ridges 7. On side 21 of the damping-valve body, at least one valve disk (not shown) covers the encircling annular passage 23, preventing any short-circuiting of the flow.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A damping valve comprising a damping valve body having opposed first and second sides, and a valve disk on one of said sides, said damping valve body comprising
   a plurality of first axial through passages for flow in a first direction between said opposed sides, each of said first though passages lying on a circle having a first pitch and having an outlet opening on one of said sides and an inflow opening on the other of said sides, said outlet openings each having a trapezoidal cross section, said outlet openings being at least partially covered by said valve disk, and
   a plurality of second axial through passages for flow in a second direction between said opposed sides, said second direction being opposite to said first direction, each of said second through passages lying on a circle having a second pitch which is smaller than the first pitch and having a radial inflow opening on said one of said sides and an outlet opening on the other of said sides, each of said outlet openings of the second through passages opening into an annular channel in the other of said sides.

2. The damping valve of claim 1 further comprising an annular channel in said one of said sides, said annular channel in said one of said sides connecting said inflow openings of said second through passages.

3. The damping valve as claimed in claim 2 further comprising a ridge encircling each of said outlet openings of each said first through passages, each said ridge having a portion bounding said annular channel in said one of said sides.

4. The damping valve as claimed in claim 1 wherein each of said inflow openings of said second through passages comprises a funnel shaped portion on said second pitch circle and a radial portion extending radially outward from said funnel shaped portion, said radial portions lying between said outlet openings of said first through passages on said first pitch circle.

5. The damping valve as claimed in claim 3 wherein each of said radial inflow openings of said second through passages comprises a funnel shaped portion on said second pitch circle and a radial portion extending radially outward from said funnel shaped portion, said radial portions lying between said outlet openings of said first through passages on said first pitch circle, each said ridge having a portion which frames an arc segment of one of said funnel shaped portions.

* * * * *